Oct. 3, 1961 C. D. WILLSON 3,002,248
THERMO-MOLDING APPARATUS
Filed March 1, 1954 2 Sheets-Sheet 2
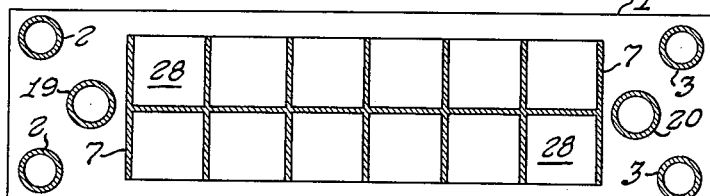
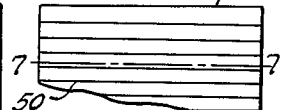
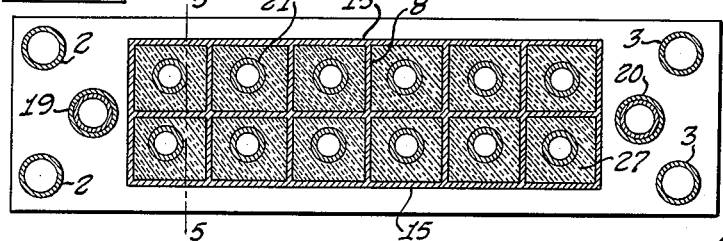
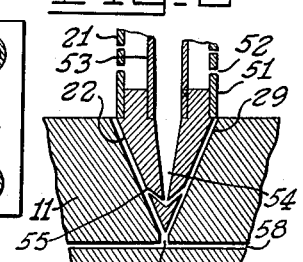
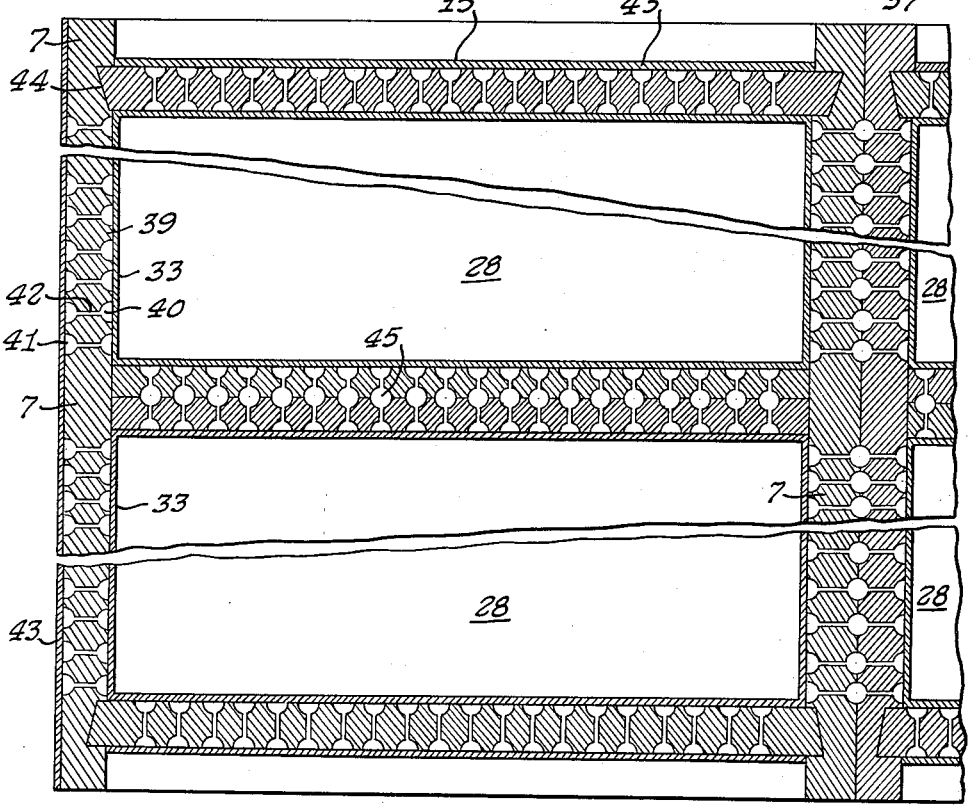
INVENTOR
Corwin D. Willson United States Patent Office 3,002,248
Patented Oct. 3, 1961

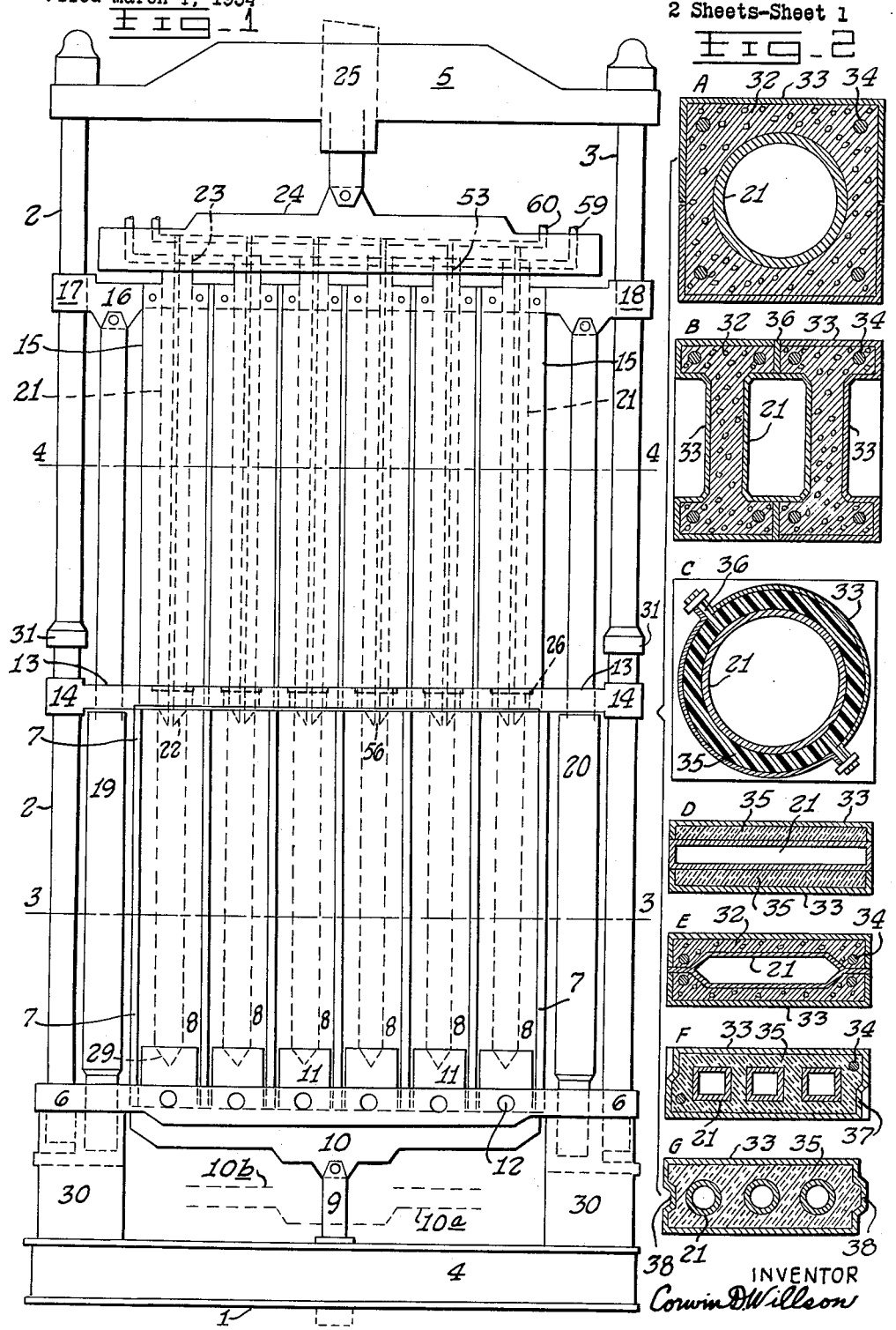

3,002,248
THERMO-MOLDING APPARATUS
Corwin D. Willson, Flint, Mich.
(525 Goldengate, Lake Orion, Mich.)
Filed Mar. 1, 1954, Ser. No. 413,383
5 Claims. (Cl. 25—45)

This invention relates to a multimolder and, more particularly, to a thermal molding apparatus that simultaneously molds a substantial number of identical products from a plastic mixture of liquid and solid constituents, products which heretofore, because of size, shape, internal voids and metal reinforcements, have been difficult to mold swiftly and cheaply even singly. Since this is an improvement on apparatus previously described in part in my copending applications Serial Nos. 681,400 filed July 3, 1946 now Patent No. 2,674,775 and 377,305 filed Aug. 31, 1953 now abandoned, this application constitutes a continuation-in-part of those applications.

Where products are to be molded from plastic constituents confined on all sides by the walls of a rigid mold, prior practice has achieved pressure on the confined mix by (a) decreasing the inner volume of the mold cavity as in my above-mentioned Ser. No. 377,305 where one mold wall confining the plastic constituents is moved inwardly relative to the others; (b) decreasing the inner molding space by expansion within the mold cavity of some molding contour of the mold, such as a core member that is already present in the mold cavity before the plastic constituents are confined in the mold, the expansion of the molding contour leaving a corresponding void in the molded product; (c) using internal pressure from the expansion of a gas in direct contact with the confined mix which only fills the mold and hardens after said expansion; and (d) the basic method of my above-mentioned application Ser. No. 681,400 where the molding is accomplished by confining a high-slump mix of concrete aggregate particles, cement and water with walls of a rigid mold, some of the walls being porous, then entering a gas under pressure, as for example, compressed air, into the interior of the confined mix and in direct contact therewith to displace water from the confined mix and force the displaced water through the porous walls, this decreasing the water-cement ratio and swiftly stiffening the product before the initial set of the cement. The instant invention, while utilizing some of the features of my co-pending applications, marks a substantial improvement on them and has the added novelty of achieving pressure on a confined mix by a means not included in those four methods just described: i.e., by the ramming thrust into the very center of the confined mix of a hollow, pointed tipped rigid mold member which forces a jet of gas ahead of its penetration into the plastic mix whereby excess liquid or solvent is voided from the mix through the porous walls of the mold.

At the present time there is need for a simple pushbutton apparatus for molding simultaneously a number of large, solid or hollow products, some metal reinforced, from a wide variety of cementitious ingredients: both those that are slowly cold-setting without pressure and those that are swiftly thermo-binding under no or substantial pressure. Thus the primary object of the invention is an apparatus for meeting this need and so versatile that it may be used to mold such diverse end products as flat and corrugated slabs, hollow panels for walls, floors and roofs, structural beams such as I, T and channel beams, posts, solid and hollow columns, tubes, pipes, troughs, irrigation flumes, containers, lengths of insulative material and other products employing either cold-setting or heat-requiring binders.

Another object of the invention is a multi-molder for molding a substantial number of bulky units at the same time, such as forty-eight slabs 2" x 24" x 8'0" or larger from mostly mineral and inorganic constituents or from mostly vegetable and organic constituents, or from combinations of the two types of constituents.

It is quite impractical according to prior practice to mold relatively thick panels from wood wastes and thermo-setting resins in a press of the steam-heated platten type. Long before the heat can penetrate from such a source into the center of the mass of highly thermally insulative wood fiber particles being bonded, the outer layer of the ingredients bond and trap steam in the interior of the panel, in consequence of which the wood has to be very thoroughly dried before bonding is attempted, and the production of panels over two inches thick is seldom attempted. Thus another object of the invention is a novel method of getting heat quickly through a mass of poorly heat-conductive constituents in the process of being thermo-bonded and having a thickness exceeding two inches.

Another object of the invention is an apparatus particularly adapted to molding thermo-binders, such as asphaltic, pitchy, resinous and synthetic binders, which are rendered cementitious by heat. Another object of the invention is a porous mold of closed type and having a smooth-faced molding cavity wherein a mass of discrete thermo-bindable particles may be confined while gaseous fluent matter, subjected to changes of temperature and pressure outside the cavity, is conveyed in a conduit of rigid cross section into the interior of the confined mass and released to be in contact with the particles, the released fluent matter making the thermo-bindable particles cementitious while pressure of the released fluent matter unites the particles and consolidates and shapes the confined mass. Another object of the invention is an apparatus comprising a mold enclosing a molding cavity on all sides with walls of which some are gaspervious, and a group of conduits to convey different kinds of fluent matter into the cavity, these kinds selected from the fluid group consisting of gaseous matter, liquid matter, solid matter in solution and solid matter in dispersion, and the conduits having means of releasing the fluent matter interiorly of a mass of discrete material confined in the cavity.

The above and other objects of the invention will become apparent as the description proceeds. By this invention I have devised a thermo-molding apparatus, controllable by pushbutton, that coordinates a considerable number of different kinds of mechanical forces to the end in view: i.e., speeding up the simultaneous molding of many identical products with a minimum of manual means. This and other novel features and objects of the invention are hereinafter more fully described and claimed and the preferred forms of my multimold apparatus are shown in the accompanying diagrammatic drawings in which:

FIG. 1 is a front view, partly in vertical section, of the multimolder as set up for molding hollow structural units.

FIG. 2 shows in drawings A to G cross-sections of a variety of typical products moldable according to the invention.

FIG. 3 is a horizontal section taken on line 3—3 of FIG. 1.

FIG. 4 is a horizontal section taken on line 4—4 of FIG. 1.

FIG. 5 is an enlargement of that part of the section of FIG. 4 adjacent line 5—5.

FIG. 6 is a side view of a portion of the mold liner shown in FIG. 5.

FIG. 7 is a horizontal section taken on line 7—7 of FIG. 6.

FIG. 8 is a vertical section of the ramming point on one of the core members shown in FIG. 1.

All accessory equipment for mixing the raw ingredients, piping the mix into the molds, for making steam, compressing air, storing an oxide of carbon, for mixing the gases, for operating the hydraulic cylinders and for conveying the molded products from the multi-molder to a point of further cure or storage, is not shown since such accessories may be merely adaptations of current equipment.

In the drawings, multi-molder or press 1 has outer framework comprising pairs of opposite side columns 2 and 3 supporting between base 4 and top-member 5 fixed press bed 6 supporting walls 7 of gangmold consisting of six back-to-back pairs of molds 8 shown open-faced in FIG. 1. Actuated by hydraulic cylinder 9, lower travel beam 10 supports pistons 11 which pass upwardly through bed 6 to fit slidingly into the bottom ends of molds 8. When beam 10 is lowered to bottom position 10a, ports 12 housed in bed 6 are opened and the discrete material to be molded may be injected through the open ports into each mold 8. Raising beam 10 to the intermediate position 10b after molds 8 are fully charged, closes ports 12. The upper ends of gangmold walls 7 fit up into the bottom of closure 13 which has outer guides 14 mounted to slide on columns 2 and 3. Closure 13 is called top closure to differentiate it from side closures 15 for each of the open-faced molds 8. Upper ends of closures 15 are fixed to intermediate travel beam 16 having guides 17 and 18 slidingly mounted on side columns 2 and 3 to permit beam 16 to be raised and lowered by hydraulic cylinders 19 and 20. When intermediate beam 16 is fully lowered, closures 15 at their lower ends fit into grooves in bed 6 and wholly close the open outer faces of molds 8. Passing through both top closure 13 and intermediate beam 16 are ramming conduits or core members 21 having lower ends comprising taper tips 22 and having upper ends 23 fixed into top travel beam 24 actuated by cylinder 25. Between tips 22 and upper ends 23 of conduits 21, spaced cross sections of conduits 21 are of substantially equal and constant area and core members or conduits 21 have rigid exteriors which are of substantially constant volume.

The apparatus functions as follows: Beginning with empty molds and lower travel beam in the 10b position, intermediate travel beam 16 is lowered to close all molds 8 with closures 15. The interior molding cavity of each mold 8 is then fully closed on all sides and top closure 13 and intermediate beam 16 are closely nested. Next, travel beam 10 is lowered to the 10a position which opens ports 12. The charge of fluid or fluent matter and solid ingredients is then injected through open ports 12 into the molds to fill the molds. Travel beam 10 is then retured to the 10b position to close ports 12 with sliding pistons 11. The entered and confined charge is now subjected to pressure by lowering beam 24 which forces core members 21 downwardly through sealing bushings 26 housed by top closure 13 into the interior of the confined charge 27 filling each mold cavity 28, taper tips 22 cutting down through the plastic constituents of the charge until tips 22 each enter receiving socket 29 in the top of each piston. Meantime, mechanical pressure exerted directly on the interior of the confined charge 27 of each mold 8 by the resistless downward passage of core-member 21 therein displaces fluid constituents of the mix and forces the displaced fluid through porous walls 7 (hereinafter more fully described) and from the mold and simultaneously forces the solid constituents of the charge toward the mold walls to shape and compact the solid constituents. Should further compaction be necessary, lower beam 10 and top beam 24 are now raised together till lower beam 10 occupies the position, near its upward maximum, shown in FIG. 1. This greatly reduces the inside volume of cavity 28 while core member 21 still is therein. Top beam 24 is then raised to a position even higher than shown in FIG. 1 and intermediate beam 16 is raised to lift side closures 15 to thus open outer faces of molds 8 and hydraulic cylinders 30 are then actuated to raise top closure 13 to limit allowed by stops 31. By this time, entire outer sides and top portions of molds 8 are open and the molded products may be removed therefrom. This may be by means of an overhead conveyor (not shown) laying hooks into co-active parts of the mold liner (hereinafter described) and drawing the molded products from cavities 28 and conveying them to a curing or storage space outside the limits of the process here being described.

Further details of the apparatus will be more clearly understood if sections of typical products molded by it are first described. In FIG. 2, A is a structural member, useful as post, lintel or floor panel and consisting of a mass rectangular in cross section molded as described from hard-set plastic material 32 confined between porous mold liner 33 and core member 21 each to be more fully hereinafter described. Composition 32, which may be concrete, is reinforced by metallic corner rods 34. Mold liner in two portions is only stripped from the molded product when the latter is sufficiently hard-set to permit handling without harmful distortion. In case the binder is Portland cement, this might be ten to thirty-six hours except for procedures hereinafter described. In FIG. 2, B shows a pair of identical I-beams, the material 32, which may be concrete, reinforced by rods 34 and compacted between mold liner 33 and core member 21 as described. In FIG. 2, C is a column, post, tube or pipe. While no metal reinforcement is shown, such a product lends itself to being reinforced with my "prestressed unit" described in my co-pending application Ser. No. 362,997 filed June 22, 1953 and abandoned after merger with co-pending application Ser. No. 604,398 filed August 16, 1956, or by woven wire mesh. In this instance, the product is molded from a mix of fibrous aggregate particles compacted in mass 35 between mold liner 33 and core member 21 according to the invention. Where it is desired to mold semi-circular troughs or irrigation flumes, mold members such as spacers 36 between the two I-beams may be inserted in the mold cavity 28 between two segments of mold liner 33. In FIG. 2, D comprises two solid slabs molded of mass 35 between mold liners 33 and core member 21, which in this instance extends from wall to opposite wall of the mold 8 between the two slabs. Four of these slabs may be molded at once in a mold the size of 8. Thus the gangmold of twelve molds in FIG. 1 can mold forty-eight of these slabs simultaneously. In FIG. 2, E comprises two metal-reinforced channel beams, as of concrete 32 standard or lightweight molded between mold liner 33 and core-member 21. Troughs, conduits and irrigation flumes of closed rectangular or open semi-rectangular cross section may be formed by the same apparatus. In FIG. 2, F comprises a single wall-thick hollow panel having mass 35 and ship-lap edges 37 molded between mold liner 33 and core members 21, each of the three core members being approximately square in cross section. In FIG. 2, G comprises a panel of mass 35 having tongue and groove edges 38 formed between mold liner 33 and three round core members 21. These various sections are shown as only a few of the examples of the great variety of products which may be molded on multi-molder 1. T beams, corrugated slabs, containers, products structural or insulative, hollow or solid may be formed, using the apparatus described, from a wide choice of raw ingredients. Where a core void, as made by member 21 is not desired within the molded product, the core member 21, as in FIGS. 2B, 2D and 2E, may be employed outside the molded product to mold a void between two solid products in the same mold.

FIG. 3 shows multi-molder 1 without side closures 15 for each mold cavity 28 in place. FIG. 4 shows the side closures 15 locked in place as side closures for cavities 28, and ram members before upward withdrawal from molds 8, in FIG. 5, hollow walls 7 house rigid mold liners 33 of filtering material hereinafter more fully described. Inside faces 39 of walls 7 have spaced upright grooves 40 and, aligned with these, outside grooves 41. All grooves 40 are connected with grooves 41 by tiny fluid passages 42 whereby fluid forced slowly through porous liners 33 may pass via grooves 40, passages 42 and grooves 41 from mold cavity 28. Thin outside facing 43 keeps displaced liquid in grooves 41 whence gravity flow carries it from multi-molder 1 for reuse in subsequent mixes to conserve binder and other valuable ingredients bled from the molded mixture. Closures 15 have outer edges held in a tight sliding fit by grooves 44 and closures 15 may be stiffened outwardly by structural bars (not shown) to take high internal mold pressures without distortion. Where walls 7 are back-to-back, grooves 41 of contiguous walls are aligned to form passages 45. It will be noted that hollow mold walls 7 surrounding the molding cavity 28 in FIG. 5 and the rigid porous inner faces 33 of cavity 28 and impervious outer facing 43 correspond to the mold structure in FIG. 8 of said co-pending application Ser. No. 681,400 wherein mold 22 has hollow side members 23 surrounding mold cavity 38, the rigid porous inner faces 26 permitting passage of fluid between mold cavity 28 and wall void 24. Obviously passage of fluid through the rigid porous inner faces 26 of said FIG. 8 and through the rigid porous inner faces 33 of said FIG. 5 may be in either direction.

Mold liner 33 may be made from finely perforated sheet metal. Another type of mold-liner material is shown in FIGS. 6 and 7 to comprise filter-plates 46 having opposite faces made up of metal strips or bars 47 fixed snugly edge-to-edge so that only a few thousandths of an inch separates them, the strips on one face of plate 46 running crosswise the strips on the opposite side and being fixed together by fasteners 48. The molding surface 49 of such a filter-plate may be highly polished and liquid under pressure will pass through cracks 50 leaving solids behind. In molding two pairs of the slabs shown in FIG. 2D in a single mold such as 8 in FIG. 1, a filtering spacer (not shown) between the two pairs may be made by simply spacing two filter-plates 46 with spaced vertical strips. One virtue of filter-plate 46 that perforated metal lacks is the ability of filter-plate 46 to conduct liquid up, down and sideways. Cracks 50 are kept from becoming clogged by passing through them cleansing liquid or gas under pressure.

FIG. 8 shows a ram member 21 to comprise outer tube 51 having perforations 52 and at the lower end fixed to taper tip 22, into the top of which is fixed small-diameter pipe 53 extending centrally of tube 51 and which connects with tip passages 54 having tiny egress orifices 55 spaced around outside of tip 22, not far from apex. In FIG. 1, pipe 53 runs to a single egress orifice 56 in the very end of tip 22. In pistons 11, receiving sockets 29 have egress orifices 57 connected by inner passages 58 with a source of compressed air which is used to clear mix ingredients from sockets 29 before entrance of tips 22 thereinto. As ram members 21 are thrust progressively downward into the confined mix that fills liners 33 in cavities 28, this thrust is eased by a jet of gas, such as compressed air, issuing from orifices 55 or 56, one type directing the jet dead ahead of advancing tip 22, the other type directing smaller jets backward from the advancing tip. Some types of mixtures will require both types of orifices in the same tip. Top ends of tubes 51 are connected by passages 59 with a source of gas under pressure. Top ends of pipes 53 are connected by passage 60 with another source of gas under pressure. Passages 59 and 60 may convey quite different kinds of gas or fluent matter or mixtures of the same. The various parts of the apparatus now having been described, specific examples of its molding uses will further clarify its structure.

Example 1

A fluent mixture of expanded slag, Portland cement and water is pumped through open ports 12 and confined on all sides in molds 8. Downward thrust of ram member 21 until taper tip 22 nests in socket 29 expels water from the confined mixture through the porous walls and low-temperature saturated steam (water vapor) is passed through tube 51 and by way of perforations 52 into the confined mixture to hasten the lime-silica reaction. With the steam and air may be mixed a small percentage of an oxide of carbon, such as carbon dioxide, to hasten the change of some of the free lime in the mixture of cement and slag to lime carbonate. A few minutes of pressure "steaming" of the molded product in this manner from the inside out and at temperatures well below 200 degrees F. has as much "curing" effect as hours of exposure to saturated steam outside the mold under atmospheric pressure according to common practice.

Example 2

A highly aqueous mixture including Portland and high alumina cements and divided mineral or vegetable fiber aggregate material having surface openings plugged with clay is confined in mold 8 and application of gas interiorly of the confined mixture and in contact therewith drives excess water from the mixture and consolidates and shapes the product, and mold liners 33 permit the molded product to be immediately removed from the mold and conveyed to a place of cure in moist air.

Example 3

A highly aqueous slurry of finely divided wood fiber containing its natural lignin and a substantial amount of natural resinous material is pumped through open ports 12 into mold 8, ports 12 are closed so that the slurry is confined on all sides by the mold walls and steam is jetted through the confined slurry from ram-member 21 to mat the fibrous particles against the filtering mold walls. Toward the end of this operation, steam of increasing heat and pressure is released through perforations 52 into the matted fibrous particles to cause the natural resins to soften and become cohesive and steam is finally applied in a series of powerful jolts to further compact, consolidate and form the agglutinated mass. Further steam dries the felted fibers and it is released from the mold practically ready for use.

Example 4

An aqueous mixture of aggregate particles and a binding resin, in this instance a phenol-formaldehyde resin in finely powdered form is confined on all sides in mold 8 and ramming action of core member 21 and use of gaseous heat and pressure in direct contact with the aggregate particles and resin powder, dry the molded product and soften and set the powder particles.

Binders which the apparatus described herein may utilize comprise calcareous cements, Portland cement, high early strength cement, natural cement, high alumina cement, lime, gypsum, magnesite, sorel cement, soluble silicate cements, phenol-formaldehyde resin and other thermosetting resins, thermoplastic resins, casein, the latexes natural and synthetic, vegetable and mineral pitches, oils, tars, gums, bitumens, rosin, asphalts and natural and synthetic resins.

One of the advantages of the apparatus described is that removal of the molded products from the mold may be speeded in those instances where the binder is very slow setting, as in the case of Portland cement. My multimolding apparatus is especially adapted to mold products, such as beams, planks and columns, that contain reinforcements of steel, rods or mesh, since the ram member either goes into the mold cavity along the neutral axis of the products being molded, as in FIGS. 2A and 2C where, in that axis, reinforcements would be wasted; or outside the product as in FIGS. 2B and 2D.

Thus, metal reinforcements, held accurately in place by the mold liner 33 are where they need not be disturbed by the molding action of the gas; the gases most commonly used being compressed air, steam, mixtures of air and steam, an oxide of carbon and mixtures of these with steam. Other gases and even fluids and liquids may be forced into molds 8 through perforations 52 and orifices 55 and 56. Instead of conveying heat and pressure to the outside of the mix or mass being molded, my apparatus applies both heat and pressure and even chemical treatment from the center outwardly and by direct contact with the particles being united. Wood preservatives, termite preventives, fire-proofing salts and the like may be forced through the aggregate particles being bonded together or agglutinated, the apparatus providing maximum heat transfer with minimal means. This reduces the length of the molding cycle, requires the use of less binder and makes it possible to mold much thicker, odder-shaped, hollow products than may be effectively thermally molded by any other means.

The invention concerns the apparatus and its uses and various changes therein may be made without departing from the spirit and scope of the invention as set forth in the appended claims; and it will be understood that any of the variants and modifications in the apparatus and its uses may be used separately and in any desired combination. Having thus fully described my invention, its utility and manner of use, what I claim and desire to secure by Letters Patent of the United States is:

I claim:

1. An apparatus for remotely controlling the thermal formation of a product, which comprises a closed mold having a molding cavity and openable to admit and closable to confine in the cavity a thermo-bindable charge of discrete material, said cavity being double-walled to have a rigid impervious outer wall and a rigid smooth-faced fluid-pervious inner wall contacting the confined charge, accessories to treat fluent matter outside the mold to changes of temperature and pressure and to achieve a hot compressed gas, a conduit to convey the treated fluent matter into the mold, apertures in a rigid length of said conduit in the mold for applying said fluent matter interiorly of said charge and said hot gas in contact with said confined material to consolidate and thermo-bind the material and shape the charge against said inner walls: said apparatus including means making mechanical and remotely controllable the steps in forming said product.

2. An apparatus for forming a product by thermal means, which comprises a closed mold having a molding cavity and openable to admit and closable to confine in the cavity a porous charge of thermo-moldable material, inner surfaces of the mold exposed to said cavity being rigid, smooth-faced and some of said surfaces being fluid-pervious, accessories outside the mold to treat fluent matter to changes of temperature and pressure that produce steam and to convey the treated fluent matter to the mold, a conduit having a rigid cross section in the mold to receive the conveyed fluent matter and apertures in the conduit through which to apply a pressured flow of the conveyed fluent matter interiorly of the confined charge and in contact with said material to thermo-mold the same against said inner surfaces.

3. A thermo-molding apparatus which comprises a mold having a molding cavity and openable to admit and closable to confine in the cavity a charge of thermo-moldable material, some of the surfaces of the mold walling said cavity being porous, accessories outside the mold to produce and convey steam to the mold, conduits of rigid cross section in the mold to receive and direct said steam in diverse directions through said charge and in contact with said thermo-moldable material and through said porous surfaces to thermally consolidate and shape said charge within said cavity.

4. An apparatus for forming a product by thermal means, which comprises a mold housing a molding cavity and openable to receive and closable to confine in the cavity a charge made up of thermo-active cementitious material, surfaces of the mold directly exposed to the cavity being rigid, smooth and fluid-pervious; accessories for treating fluent matter outside the mold to changes of pressure and temperature and to achieve a hot gas, conduits operatively mounted to be thrust as a rigid group deeply into, and to be withdrawn from the mold cavity, means conveying the treated fluent matter to said conduits, orifices in the conduits for releasing the conveyed fluent matter deeply inside the confined charge and for directing jets of said hot gas in diverse directions interiorly of the confined charge and in contact with said thermo-active cementitious material to thermally consolidate and shape said charge within said cavity.

5. A product-forming apparatus which comprises a closed mold having a molding cavity and openable to admit and closable to confine in the cavity a cementitious charge of discrete and fluid materials, said cavity surrounded by smooth-faced filtering walls, a sealing bushing piercing one wall of the cavity, means reducing the volume of said cavity comprising a retractable ramming conduit powered to be thrust snugly through said bushing deeply into the confined charge whereby to expel some of said fluid through said walls, orifices in the entered end and rigid sides of said conduit wherethrough to release a flow of fluent matter interiorly of the confined materials and in contact therewith, and accessories outside the mold to pressure and convey said flow toward and through said walls to consolidate and shape said charge within said cavity before retraction of said conduit therefrom.

References Cited in the file of this patent

UNITED STATES PATENTS

| | | |
|---|---|---|
| 1,017,876 | Landis | Feb. 20, 1912 |
| 1,030,389 | Crossley | June 25, 1912 |
| 1,149,669 | Mauerberger | Aug. 10, 1915 |
| 1,396,779 | Post et al. | Nov. 15, 1921 |
| 1,416,691 | Crozier | May 23, 1922 |
| 1,438,448 | McCoy | Dec. 12, 1922 |
| 1,552,064 | Lake | Sept. 1, 1925 |
| 1,846,279 | Speirs | Feb. 23, 1932 |
| 1,968,774 | Meier | July 31, 1934 |
| 2,079,665 | Seigle | May 11, 1937 |
| 2,277,789 | Sink | Mar. 31, 1942 |
| 2,528,643 | Dubbs | Nov. 7, 1950 |
| 2,638,655 | Creskoff | May 19, 1953 |
| 2,674,775 | Willson | Apr. 13, 1954 |

FOREIGN PATENTS

| | | |
|---|---|---|
| 497,935 | Canada | Nov. 24, 1953 |
| 692,313 | France | July 29, 1930 |
| 640,325 | Great Britain | July 19, 1950 |
| 673,261 | Great Britain | June 4, 1952 |